US008644662B2

(12) United States Patent
Mune et al.

(10) Patent No.: US 8,644,662 B2
(45) Date of Patent: Feb. 4, 2014

(54) OPTICAL CONNECTION STRUCTURE AND PRODUCTION METHOD OF OPTICAL WAVEGUIDE TO BE USED FOR THE OPTICAL CONNECTION STRUCTURE

(75) Inventors: Kazunori Mune, Ibaraki (JP); Junichi Fujisawa, Ibaraki (JP); Yuichi Tsujita, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 479 days.

(21) Appl. No.: 13/074,690

(22) Filed: Mar. 29, 2011

(65) Prior Publication Data
US 2011/0286701 A1 Nov. 24, 2011

(30) Foreign Application Priority Data

May 24, 2010 (JP) ................. 2010-118512

(51) Int. Cl.
*G02B 6/30* (2006.01)
*G02B 6/26* (2006.01)
*G02B 6/32* (2006.01)
*G02B 6/02* (2006.01)
*G02B 6/10* (2006.01)
*B05D 5/06* (2006.01)

(52) U.S. Cl.
USPC .................. 385/49; 385/31; 385/33; 385/50; 385/51; 385/52; 385/123; 385/130; 385/132; 427/163.2

(58) Field of Classification Search
USPC ......... 385/31, 33, 49–52, 74, 83, 88–94, 123, 385/128–129, 130, 132; 427/163.2
See application file for complete search history.

(56) References Cited

U.S. PATENT DOCUMENTS

| 5,557,695 A * | 9/1996 | Yamane et al. ............ 385/49 |
| 6,141,366 A * | 10/2000 | Yoneda ............. 372/50.1 |
| 6,584,807 B1 * | 7/2003 | Tregoat et al. ........... 65/386 |

(Continued)

FOREIGN PATENT DOCUMENTS

| CA | 2335045 A1 | 12/1999 |
| JP | 8-313756 A | 11/1996 |

(Continued)

OTHER PUBLICATIONS

Japanese Office Action dated May 28, 2013, issued in corresponding Japanese Patent Application No. 2010-118512, w/ English translation.

*Primary Examiner* — Uyen Chau N Le
*Assistant Examiner* — Michael Mooney
(74) *Attorney, Agent, or Firm* — Westerman, Hattori, Daniels & Adrian, LLP

(57) ABSTRACT

An optical connection structure which permits easy and automatic alignment between the optical axes of optical fibers and the optical axes of cores of an optical waveguide, and a production method which ensures that an optical waveguide for the optical connection structure can be efficiently produced with higher dimensional accuracy are provided. An over-cladding layer of the optical waveguide includes an extension portion provided in a longitudinal end portion thereof, and optical fiber fixing grooves are provided in the extension portion as extending along extension lines of cores coaxially with the cores and each having opposite ends, one of which is open in an end face of the extension portion and the other of which is closed. Optical fibers are fitted and fixed in the respective optical fiber fixing grooves. The over-cladding layer further includes a boundary portion (6) provided between the other closed ends of the optical fiber fixing grooves and the cores.

5 Claims, 4 Drawing Sheets

(56) References Cited

U.S. PATENT DOCUMENTS

| | | |
|---|---|---|
| 6,788,853 B2 * | 9/2004 | Steinberg et al. ............... 385/49 |
| 7,010,199 B2 * | 3/2006 | Kim et al. ...................... 385/49 |
| 7,826,699 B2 | 11/2010 | Juni |
| 7,876,988 B2 * | 1/2011 | Yasuda et al. .................. 385/49 |
| 2009/0102815 A1 | 4/2009 | Juni |
| 2009/0202737 A1 | 8/2009 | Shimizu |

FOREIGN PATENT DOCUMENTS

| | | |
|---|---|---|
| JP | 2000-105324 A | 4/2000 |
| JP | 2001-350051 A | 12/2001 |
| JP | 2002-519711 A | 7/2002 |
| JP | 2007-72007 A | 3/2007 |
| JP | 2009-103902 A | 5/2009 |
| JP | 2009-186834 A | 8/2009 |

* cited by examiner

OPTICAL CONNECTION STRUCTURE AND PRODUCTION METHOD OF OPTICAL WAVEGUIDE TO BE USED FOR THE OPTICAL CONNECTION STRUCTURE

BACKGROUND OF THE INVENTION

1. Field of the Invention

An optical connection structure which permits connection between an optical fiber and an optical waveguide without centering, and a production method of an optical waveguide to be used for the optical connection structure are disclosed.

2. Description of the Related Art

Optical fibers are generally used for optical communications and the like for transmitting optical signals for relatively long distances. An optical waveguide is used for connection between the optical fibers and for transmission of the signals for relatively short distances. In order to facilitate alignment between the optical axes of the optical fibers and the optical axes of the optical waveguide (or to obviate a centering operation) for the optical connection, it is a conventional practice to provide optical fiber fixing grooves coaxially with cores of the optical waveguide in a substrate formed with the optical waveguide, and fit the optical fibers in the grooves for positioning and fixing the optical fibers.

The optical fiber fixing grooves are provided in a longitudinal end portion of the optical waveguide (in areas of the longitudinal end portion extending along extension lines of the cores and not formed with the cores). The grooves are typically elongated grooves each having a V- or U-shaped cross section, and one-side ends of the grooves are open in a longitudinal end face of the optical waveguide to communicate with the outside.

Exemplary methods for forming the optical fiber fixing grooves include a method such that grooves are preliminarily formed in a substrate serving as a base to be formed with an optical waveguide by etching, embossing or machining (e.g., cutting) (see, for example, JP-A-HEI8(1996)-313756 and JP-A-2001-350051), and a method such that core-containing parts of an end portion of an optical waveguide formed on a substrate are cut off by dicing or by irradiation with a laser beam to form grooves and expose ends (end faces) of the cores (see, for example, JP-A-2000-105324).

However, a structure obtained by preliminarily forming the optical fiber fixing grooves in the base substrate to be formed with the optical waveguide suffers from lower dimensional and positional accuracy of the grooves due to limitation in the accuracy of the etching process and the machining process. Since the optical waveguide is formed on the substrate after the formation of the grooves, it is difficult to properly position the optical waveguide cores with respect to the optical fiber fixing grooves. This often requires an additional process for cutting an end portion of the optical waveguide to expose the ends of the cores, so that processing errors are liable to be gradually accumulated. As a result, the optical axes of the optical fibers (optical fiber cores) are not accurately aligned with the optical axes of the optical waveguide cores.

A structure obtained by forming the grooves by cutting off the core-containing parts of the end portion of the optical waveguide formed on the substrate by dicing or the like also suffers from lower dimensional and positional accuracy due to limitation in the accuracy of the machining process. Where the formation of the grooves is achieved by utilizing the laser beam, the laser processing accuracy is higher than the aforementioned machining accuracy. However, the characteristic properties of the optical waveguide are liable to be degraded due to heating with the laser beam, and dust is liable to remain after the laser processing.

An optical connection structure is provided which permits easy and automatic alignment between the optical axes of the optical fibers and the optical axes of the optical waveguide cores. An optical waveguide production method is also provided which ensures that an optical waveguide to be used for the optical connection structure can be efficiently produced with higher dimensional accuracy.

SUMMARY OF THE INVENTION

There is provided an optical connection structure, which comprises: an optical waveguide including a light transmission core, an under-cladding layer underlying the core, and an over-cladding layer provided over the core; and an optical fiber fixed to a longitudinal end of the optical waveguide for mutual transmission of an optical signal between the optical fiber and the core of the optical waveguide; wherein the over-cladding layer of the optical waveguide includes an extension portion provided in a longitudinal end portion thereof; wherein the extension portion includes an optical fiber fixing groove extending along an extension line of the core coaxially with the core and having opposite ends, one being open in an end face of the extension portion and the other end being closed, and a boundary wall provided between the core and the other closed end of the optical fiber fixing groove; wherein the optical fiber is fitted and fixed in the optical fiber fixing groove with its optical axis being aligned with an optical axis of the core of the optical waveguide via the boundary wall.

There is also provided an optical waveguide production method for producing an optical waveguide to be used for the optical connection structure described above, the method comprising the steps of: forming the under-cladding layer; forming the core on the under-cladding layer; applying an over-cladding layer formation photosensitive resin over the under-cladding layer and the core to form an over-cladding layer formation photosensitive resin layer including an extension portion formation photosensitive resin layer extending longitudinally outward of an end of the core; exposing the over-cladding layer formation photosensitive resin layer via a photomask by irradiation with radiation; and developing the over-cladding layer formation photosensitive resin layer; whereby the over-cladding layer including the extension portion is formed and, at the same time, the optical fiber fixing groove is formed in the extension portion with the boundary wall being present between the closed end thereof and the core.

The misalignment between the optical axes of the optical fibers fitted in the optical fiber fixing grooves of the optical waveguide and the optical axes of the optical waveguide cores is mainly caused due to the lower dimensional accuracy of the optical fiber fixing grooves formed by a chemical process such as etching or by a physical process such as dicing. To cope with this, a photo process such as photolithography is utilized, which ensures much higher dimensional accuracy than the chemical process and the physical process, for the formation of the optical fiber fixing grooves.

The alignment between the optical axis of the optical fiber and the optical axis of the optical waveguide core is intended to mean that the optical axis of the optical fiber is aligned with the optical axis of the optical waveguide core to a degree such as not to adversely affect the transmission of the optical signal. The alignment means not only perfect alignment such that the optical axis of the optical fiber is perfectly aligned with the optical axis of the optical waveguide core, but also rough alignment such that the optical connection is maintained with a lower coupling loss with the optical axis of the optical fiber being slightly misaligned with the optical axis of the optical waveguide core.

In the optical connection structure, the optical fiber fixing groove is provided in the extension portion disposed in the longitudinal end portion of the over-cladding layer, and extends along the extension line of the optical waveguide core coaxially with the core. Therefore, the optical connection structure ensures that the optical fiber fitted and fixed in the optical fiber fixing groove can be automatically properly positioned with respect to the optical waveguide core and, hence, the axis of the optical fiber fitted and fixed in the optical fiber fixing groove can be easily and automatically aligned with the optical axis of the optical waveguide core (without centering).

In the extension portion of the over-cladding layer, the boundary wall is disposed between the core and the other closed end of the optical fiber fixing groove. The optical axis of the optical fiber fitted in the optical fiber fixing groove is aligned with the optical axis of the optical waveguide core via the boundary wall. Therefore, when the optical fiber is fitted in the optical fiber fixing groove, the optical fiber does not directly contact the core. Thus, an end face (optical connection surface) of the core is free from distortion and damage. The boundary wall is a part of the over-cladding layer and, therefore, is free from deformation even if a pressure is applied to the boundary wall by the optical fiber. This suppresses misalignment of the optical axes to some extent. Since the boundary wall covers the end face of the core, adhesion of dust to the optical connection surface can be prevented.

Where the over-cladding layer including the extension portion is a layer formed from a photosensitive resin with reference to the position of the core or a positioning alignment mark, the over-cladding layer, the extension portion and the optical fiber fixing groove are accurately formed in originally designed positions with respect to the optical axis of the optical waveguide core. Therefore, the optical axis of the optical fiber core and the optical axis of the optical waveguide core are more accurately aligned with each other, so that the optical coupling loss therebetween can be reduced. In addition, where a plurality of optical fiber fixing grooves are provided in the optical connection structure, variations in groove pitch and product-to-product variations are reduced. This improves the coupling quality of the optical connection.

Where the optical waveguide core includes a lens portion provided at the longitudinal end thereof and having an outwardly convex lens surface, the lens portion suppresses the scattering of light outputted from the optical waveguide core, and gathers light received from the optical fiber core. Even if the optical fiber core and the optical waveguide core are slightly misaligned with each other, an increase in optical coupling loss can be suppressed which may otherwise occur due to the misalignment between the optical axis of the optical fiber core and the optical axis of the optical waveguide core. Where the optical signal is transmitted through the boundary wall of the over-cladding layer or where a distal end of the optical fiber does not abut against the boundary wall with a small gap being present between the distal end of the optical fiber and the boundary wall, the light gathering effect ensures proper transmission of the optical signal between the optical fiber and the optical waveguide.

In the optical waveguide production method for producing the optical waveguide to be used for the optical connection structure, the over-cladding layer formation photosensitive resin is applied over the under-cladding layer and the core to form the over-cladding layer formation photosensitive resin layer including the extension portion formation photosensitive resin layer which extends longitudinally outward of the end of the core. Then, the over-cladding layer formation photosensitive resin layer is patterned by the photolithography process to form the over-cladding layer including the extension portion. At the same time, the optical fiber fixing groove is formed in the extension portion with the boundary wall being present between the closed end thereof and the core. Therefore, this method ensures efficient and accurate formation of the optical fiber fixing groove with the use of the same over-cladding layer formation material. Since the less accurate groove processing method conventionally employed for the optical connection structure is not employed for the formation of the groove, the optical fiber fixing groove can be formed with higher dimensional and positional accuracy. Therefore, the optical axis of the optical fiber fitted in the groove and the axis of the optical waveguide core are accurately aligned with each other, so that the optical coupling loss therebetween can be reduced. Thus, the optical waveguide production method ensures that the optical waveguide to be used for the optical connection structure can be efficiently produced as having a higher quality at lower costs.

Where the photomask for the over-cladding layer is positioned with reference to the position of the core or a positioning alignment mark to form the optical fiber fixing groove coaxially with the core in the inventive optical waveguide production method, the optical fiber fixing groove is accurately formed in an originally designed position with respect to the position (optical axis) of the optical waveguide core. Therefore, the optical axis of the optical fiber core and the optical axis of the optical waveguide core are more accurately aligned with each other, so that the optical coupling loss therebetween can be reduced. In addition, product-to-product variations are suppressed, thereby improving the yield of the optical waveguide.

DETAILED DESCRIPTION

An embodiment will hereinafter be described in detail with reference to the attached drawings.

Figure 1:
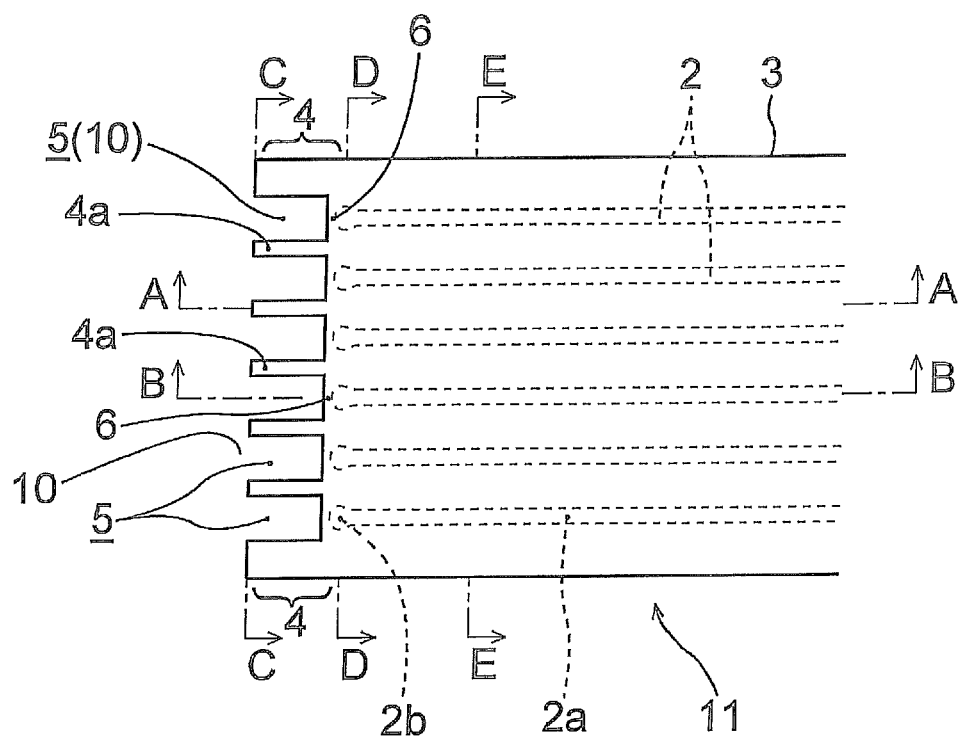
FIG. 1 is a plan view showing the construction of an optical waveguide to be used for an optical connection structure.
Figure 2A:
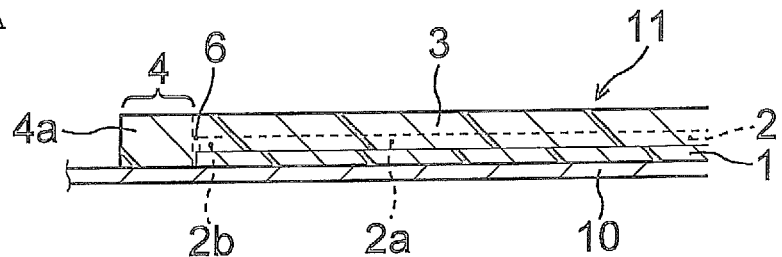
FIGS. 2A, 2B, 2D and 2E are sectional views taken along lines A-A, B-B, D-D and E-E, respectively, in FIG. 1.
Figure 2B:
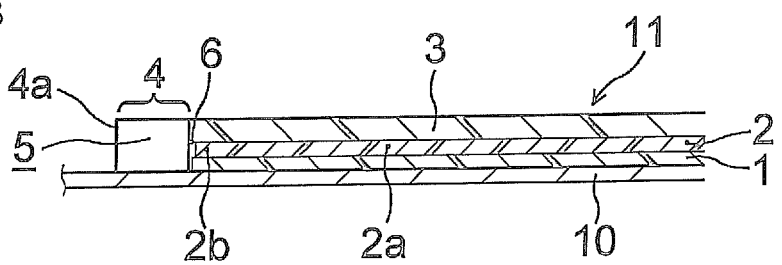
Figure 2C:
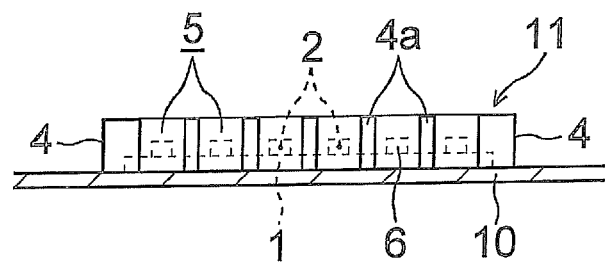
FIG. 2C is an end face view as seen in an arrow direction C-C.
Figure 2D:
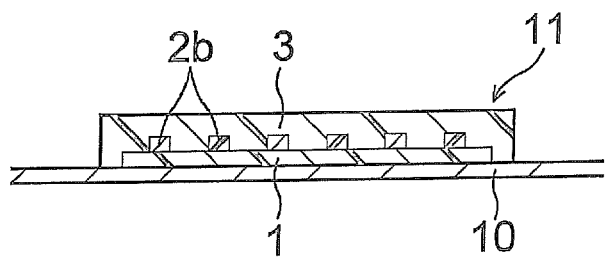
Figure 2E:
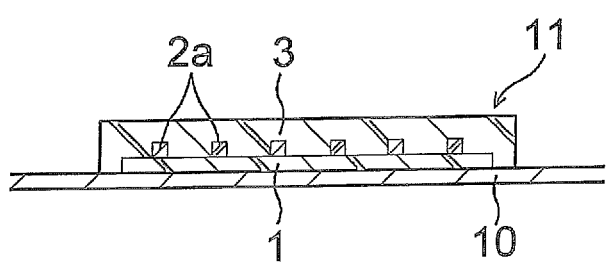

FIG. 1 is a plan view schematically showing the construction of an optical waveguide to be used for an optical connection structure according to this embodiment. FIGS. 2A and 2B are longitudinal sectional views of the optical waveguide (taken along lines A-A and B-B, respectively, in FIG. 1), and FIG. 2C is a transverse sectional view (as seen in an arrow direction C-C in FIG. 1). FIGS. 2D and 2E are transverse sectional views of the optical waveguide (taken along lines D-D and E-E, respectively, in FIG. 1). In FIGS. 1 and 2A to 2E, a reference character 10 denotes a substrate, and a reference character 11 denotes an elongated optical waveguide, which is provided on the substrate 10 and includes an under-cladding layer 1, cores 2 and an over-cladding layer 3. A longitudinal side (left side in FIGS. 1, 2A and 2B) of the illustrated optical waveguide 11 on which optical fiber fixing grooves 5 are formed is called "one side", and a side (right side in FIGS. 1, 2A and 2B) on which the optical waveguide 11 continuously extends away from the one side is called "the other side".

As shown in FIG. 1, the optical waveguide 11 to be used for the optical connection structure according to this embodiment includes an extension portion 4 provided in a longitudinal end portion thereof and formed from an over-cladding layer material. The extension portion 4 has a multiplicity of optical fiber fixing grooves 5 (six optical fiber fixing grooves arranged in juxtaposition in this embodiment) in which optical fibers are respectively fitted and fixed. The optical fiber fixing grooves 5 are elongated longitudinally of the optical waveguide 11 (along the optical axes of the cores 2) and, as shown in FIG. 2B, one-side ends of the optical fiber fixing grooves 5 (on the left side) are open in an end face of the extension portion 4 to communicate with the outside.

The other-side ends of the optical fiber fixing grooves 5 are closed with a boundary wall 6 disposed between the optical fiber fixing grooves 5 and ends of the cores 2. When the optical fibers 12 are connected (optically connected) to the optical waveguide 11, as shown in FIGS. 3B to 3D, end portions of the optical fibers 12 are inserted into the respective optical fiber fixing grooves 5 for engagement, and fixed in the optical fiber fixing grooves 5 with distal ends (optical connection surfaces) of the optical fibers 12 in abutment against the boundary wall 6 at the other-side ends of the grooves 5.

The construction of the optical waveguide 11 for the optical connection structure will be described in greater detail. The optical waveguide 11 has the same basic construction as a polymer-based optical waveguide of a film form. In the optical waveguide 11, as shown in FIG. 1, the cores 2 (six cores 2 in this embodiment) continuously extend longitudinally of the optical waveguide 11, and each have a generally square cross section. The under-cladding layer 1 underlies the cores 2, and has a generally rectangular cross section. The over-cladding layer 3 covers the cores 2 and the under-cladding layer 1.

The extension portion 4 is provided in a longitudinal end portion (left longitudinal end portion in FIG. 1) of the over-cladding layer 3, and extends longitudinally outward from a position corresponding to a longitudinal end of a conventional optical waveguide (leftward of the line D-D in FIG. 1). As shown in FIG. 2A, the extension portion 4 is formed by applying the over-cladding layer material over the cores 2 to even cover a region longitudinally outward of the one-side ends of the cores 2 and curing the material. The extension portion 4 includes longitudinal elevational walls 4a, 4a, . . . spaced a predetermined distance from each other transversely of the optical waveguide 11 as shown in FIG. 2C. The longitudinal elevational walls 4a define side walls of the optical fiber fixing grooves 5, and the optical fiber fixing grooves 5 are defined between the elevational walls 4a. The optical fiber fixing grooves 5 each have a longitudinal length that is sufficient to hold the end portions of the optical fibers, e.g., 500 μm to 5 mm.

The elevational walls 4a defining the optical fiber fixing grooves 5 therebetween each have very high positional and dimensional accuracy, because the elevational walls 4a are formed by a photo process as will be described later. Accordingly, the optical fiber fixing grooves 5 defined between the elevational walls 4a each have very high positional and dimensional accuracy and, hence, are accurately formed along extension lines of the cores 2 coaxially with the cores 2. As will be described later, the optical fiber fixing grooves 5 each have an accurate width that is equal to the diameter of the optical fiber to be connected (the outer diameter of a cladding layer of the optical fiber) as designed.

The extension portion 4 extends longitudinally outward of the one-side ends of the cores 2, and includes the boundary wall 6 provided between the other-side ends of the optical fiber fixing grooves 5 and the cores and formed from the over-cladding layer material. The thickness of the boundary wall 6 (equivalent to distances between the ends of the cores 2 and the ends of the optical fibers) is, for example, 50 to 500 μm.

As shown in FIG. 2B, a surface (upper surface) of the substrate 10 is exposed in bottoms of the optical fiber fixing grooves 5 to support the optical fibers.

The cores 2, which serve as optical paths, each have a straight portion 2a provided in a longitudinally intermediate portion thereof and having a linear shape and a square cross section as shown in FIGS. 1 and 2E, and a lens portion 2b provided at the longitudinal one end thereof as shown in FIGS. 1 and 2D.

Next, the optical connection structure will be described, which permits optical connection between the optical waveguide 11 and the optical fibers 12 fitted in the respective optical fiber fixing grooves 5 without centering.

Figure 3A:
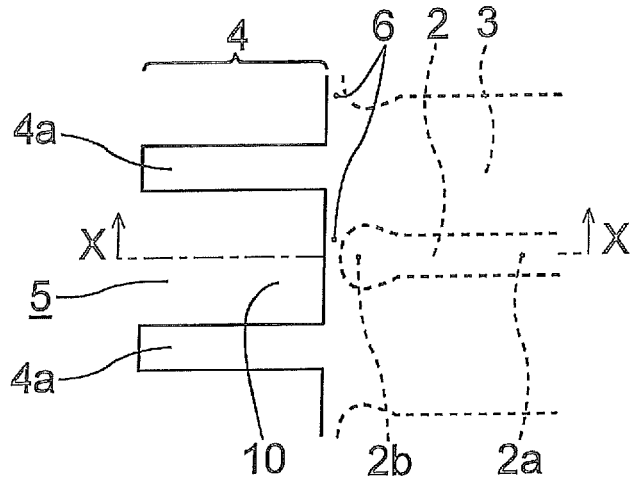
FIG. 3A is a diagram showing the major construction of the optical waveguide in the optical connection structure.
Figure 3B:
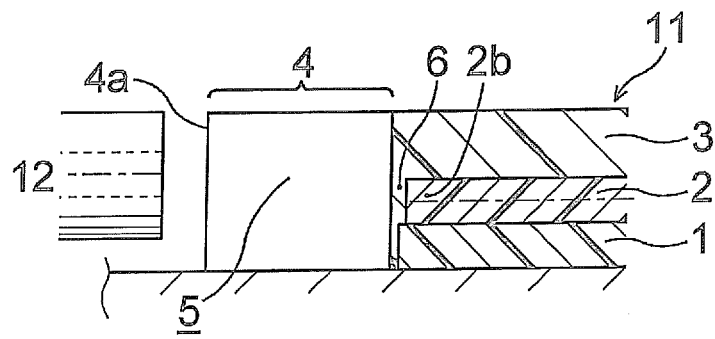
FIGS. 3B to 3D are diagrams for explaining how to engage an optical fiber with the optical waveguide.
Figure 3C:
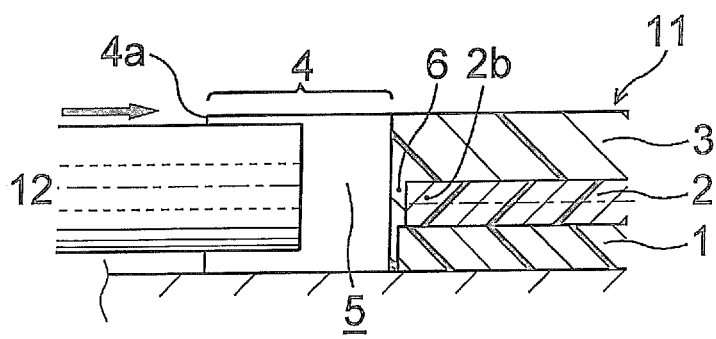
Figure 3D:
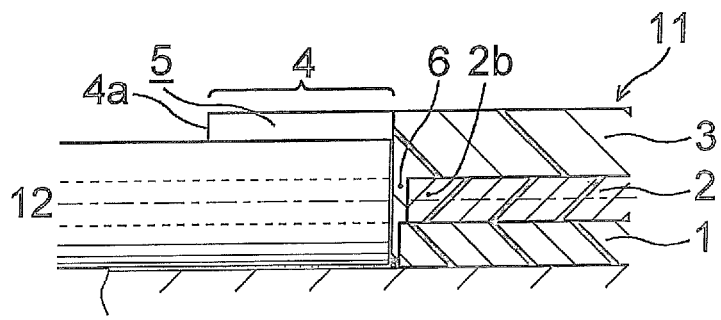

FIGS. 3A to 3D are schematic diagrams for explaining the connection (optical connection structure) of the optical fibers 12 with the optical fiber fixing grooves 5 of the optical waveguide 11. Particularly, FIG. 3A is an enlarged diagram (plan view) for explaining major portions of the extension portion 4 of the optical waveguide 11 for the optical connection structure, and FIGS. 3B to 3D are sectional views (taken along a line X-X) for explaining how to fit the optical fiber 12 in the optical fiber fixing groove 5. The optical axis of the optical waveguide core and the optical axis of the optical fiber are indicated by one-dot-and-dash lines.

When the optical fibers 12 are connected (optically connected) to the optical waveguide 11, as described above, the end portions (distal end portions) of the optical fibers 12 are inserted into the optical fiber fixing grooves 5 as shown in FIG. 3C and, finally, the distal ends (optical connection surfaces) of the optical fibers 12 are brought into abutment against the boundary wall 6 at the innermost ends of the grooves 5. Thus, the optical fibers 12 are positioned in predetermined positions in the optical fiber fixing grooves 5 with their lower surfaces being supported in contact with the upper surface of the substrate 10 in the bottoms of the optical fiber fixing grooves 5. As shown in FIG. 3D, the under-cladding layer 1 has the same thickness as the cladding layers of the inserted optical fibers 12, so that the optical axes of the optical fibers 12 and the optical axes of the cores 2 are automatically located at the same vertical level with the optical fibers 12 being fixed in the predetermined positions in the optical fiber fixing grooves 5.

At this time, the optical fibers 12 fitted in the respective optical fiber fixing grooves 5 formed in the extension portion 4 of the optical waveguide 11 are automatically properly positioned with respect to the optical waveguide cores 2, because the optical fiber fixing grooves 5 are coaxial with the cores 2. Thus, the optical connection structure for the connection between the optical fibers 12 and the optical waveguide 11 permits easy and natural alignment between the optical axes of the optical fibers 12 and the optical axes of the optical waveguide cores 2 without centering.

The boundary wall 6 is disposed between the optical fibers 12 and the optical waveguide cores 2, and the optical axes of the optical fibers 12 are respectively aligned with the optical axes of the optical waveguide cores 2 via the boundary wall 6. Therefore, the optical fibers 12 do not directly contact the cores 2 when the optical fibers 12 are fitted in the optical fiber fixing grooves 5. Even if the optical waveguide is a polymer-based optical waveguide, the end faces (optical connection surfaces) of the cores 2 are free from distortion and damage. Further, even if a pressure is applied to the boundary wall 6 by the optical fibers 12, the boundary wall 6 is less liable to deform. This suppresses misalignment of the optical axes to some extent. Since the boundary wall 6 covers the end faces of the cores 2, adhesion of dust on the optical connection surfaces can be prevented, which may otherwise increase the optical coupling loss.

The cores 2 of the optical waveguide 11 each include the lens portion 2b provided at the one end thereof and having the convex lens surface. The lens portion 2b suppresses the scattering of light outputted from the core 2, and gathers light received from the optical fiber 12. Even if the optical axes of the optical fibers 12 are slightly misaligned with the optical axes of the optical waveguide cores 2, the optical connection structure reduces the optical coupling loss which may otherwise occur due to the misalignment. Even if the ends (optical connection surfaces) of the optical fibers 12 do not abut against the boundary wall 6 with a small gap being present between the ends of the optical fibers 12 and the boundary wall 6, the light gathering effect ensures proper transmission of optical signals between the optical fibers 12 and the optical waveguide cores 2.

The thickness (height) and the width of each of the cores 2, the core pattern pitch (interconnection pitch) and the number of the cores 2 are determined in conformity with the standards of the optical fibers 12 to be connected. The width of each of the optical fiber fixing grooves 5 is determined in conformity with the outer diameter of each of the optical fibers to be connected. The thickness of the under-cladding layer 1 is equal to the thickness of the cladding layer of each of the optical fibers 12 to be connected.

This embodiment is directed to a case in which the cores 2 each have the convex lens portion 2b provided at the one end thereof, but the lens portion 2b may be configured to have a taper angle and a lens surface curvature radius optimized based on a difference in refractive index between the cores 2 and the over-cladding layer 3 (boundary wall 6), and the width and the height (thickness) of each of the cores 2.

Further, the cores 2 may be each configured so as to be flared from the longitudinally intermediate straight portion to the one end (left end in FIG. 3A) rather than have the lens portion 2b. Where the optical fibers 12 to be connected each have a core diameter of 50 μm, for example, the straight portions 2a of the optical waveguide cores 2 may each have a sectional shape having a height (thickness) of 40 μm and a width of 40 μm, and the one-side ends (left ends in FIG. 3A) of the optical waveguide cores 2 may each have a slightly larger sectional shape having a height (thickness) of 40 μm and a width of 50 μm. Like the lens portion 2b, the flared shape can improve the optical coupling efficiency between the optical waveguide cores 2 and the optical fibers 12.

Next, a method for producing the optical waveguide to be used for the optical connection structure according to this embodiment will be described.

FIGS. 4A to 4F are diagrams for explaining a sequence of the steps of the method for producing the optical waveguide to be used for the optical connection structure.

Figure 4A:
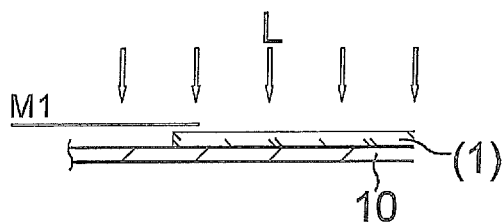
FIGS. 4A to 4F are diagrams for explaining a production method of the optical waveguide to be used for the optical connection structure.

In the optical waveguide production method according to this embodiment, as shown in FIG. 4A, an under-cladding layer 1 having a predetermined width is formed on a substrate 10 such as a glass plate, a resin plate, a Si wafer, a thin film or a metal foil by a photolithography process employing a photosensitive resin.

Figure 4B:
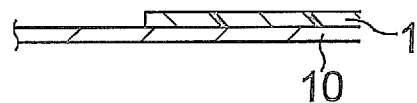

The formation of the under-cladding layer 1 is achieved in the following manner. As shown in FIG. 4A, a varnish of the photosensitive resin is applied on the substrate 10 by a spin coating method, a dipping method, a die coating method, a roll coating method or the like. In turn, the resulting photosensitive resin layer 1' is irradiated with radiation as indicated by white arrows L via a photomask M1 for exposure in a predetermined pattern, and developed. Thus, the under-cladding layer 1 is formed as having the predetermined pattern as shown in FIG. 4B.

Figure 4C:
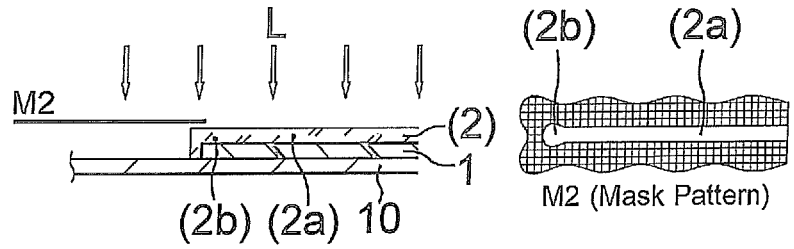

Subsequently, cores 2 are formed on the under-cladding layer 1 in substantially the same manner as described above by the photolithography process. For the formation of the cores 2, as shown in FIG. 4C, a varnish of a photosensitive resin is applied on the under-cladding layer 1 by a spin coating method, a dipping method, a die coating method, a roll coating method or the like, and then the resulting photosensitive resin layer 2' is irradiated with radiation L via a photomask M2 having opening patterns corresponding to a predetermined core pattern. Thus, the photosensitive resin layer 2' is exposed in the predetermined core pattern.

As shown in a right-hand portion of FIG. 4C, the opening patterns of the photomask M2 to be used at this time each have an intermediate portion extending linearly and conformal to the straight portion 2a of the core 2, and an end portion (one end portion) having a greater width than the middle portion and conformal to the lens portion 2b of the core 2 having the outwardly convex lens surface.

Figure 4D:
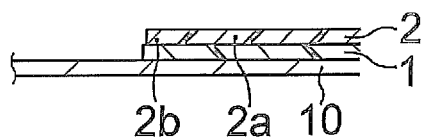

Thereafter, a heat treatment is performed for completion of a photo reaction depending on the type of the photosensitive resin, and then the resulting photosensitive resin layer 2' is developed with the use of a developing liquid by a dipping method or the like. Thus, an unexposed portion of the photosensitive resin layer 2' is dissolved away, whereby the cores 2 are formed as shown in FIG. 4D.

Figure 4E:
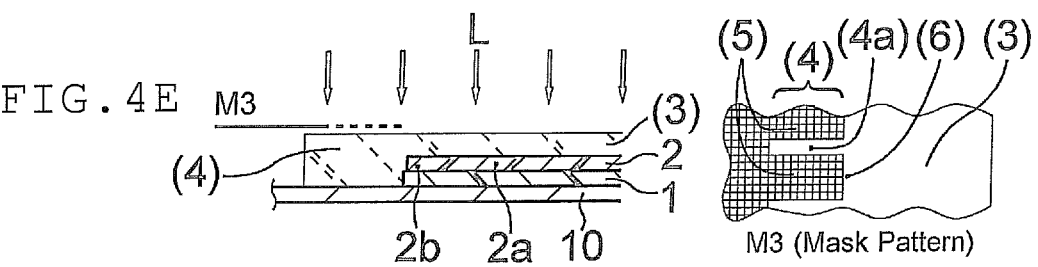
Figure 4F:
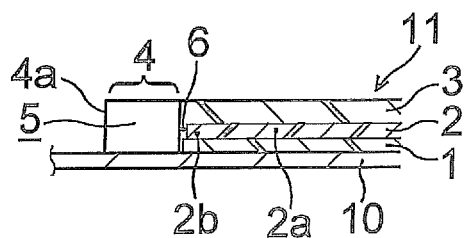

Then, as shown in FIG. 4E, an over-cladding layer material (photosensitive resin) is applied over the under-cladding layer 1 and the cores 2 by a coating method or the like to form an over-cladding layer formation photosensitive resin layer 3' including an extension portion formation photosensitive resin layer which extends longitudinally outward of the one-side ends (left ends in FIG. 4E) of the cores 2. At this time, one end portion of the under-cladding layer 1 is also covered with the over-cladding layer formation photosensitive resin layer. In turn, the positions of the cores 2 covered with the over-cladding layer material or the positions of the positioning alignment marks formed simultaneously with the cores 2 are detected visually or by an optical microscope or an optical sensor, or by image processing utilizing a camera, and a photomask M3 is positioned with reference to the positions of the cores or the positions of the alignment marks. Then, the over-cladding layer formation photosensitive resin layer 3' is exposed via the photomask M3, and developed. Thus, the optical waveguide 11 for the optical connection structure is produced as shown in FIG. 4F.

More specifically, a varnish of the over-cladding layer formation photosensitive resin is applied over the under-cladding layer 1 and the cores 2. At this time, as shown in FIG. 4E, the resulting over-cladding layer formation photosensitive resin layer even covers a region longitudinally outward of the one-side ends (lens portions 2b) of the cores 2 and the longitudinal end (left end in FIG. 4E) of the under-cladding layer 1. The application of the varnish is achieved, for example, by a spin coating method, a dipping method, a die coating method, a roll coating method or the like. Thereafter, the over-cladding layer formation photosensitive resin layer 3' is cured.

For the curing, the over-cladding layer formation photosensitive resin layer 3' is exposed to radiation L via the photomask M3. The photomask M3 has a comb-like mask pattern provided in a longitudinal end portion thereof as corresponding to the optical fiber fixing grooves 5 as shown in a right-hand portion of FIG. 4E. Before the positioning of the photomask M3, the positions of the cores 2 or the positions of the positioning alignment marks are preliminarily detected as a positioning reference by an optical microscope, an optical sensor or the like. With reference to the detected positions, the photomask M3 is accurately positioned so that opening patterns thereof for the optical fiber fixing grooves 5 are located in predetermined positions on the extension portion formation photosensitive resin layer in which the extension portion 4 of the optical waveguide 11 is to be formed.

The method of positioning the photomask M3 will be described in greater detail. Exemplary positioning methods include: (A) a method in which the photomask M3 is positioned with reference to the cores 2 (core pattern) formed on the under-cladding layer 1; and (B) a method in which the photomask M3 is positioned with reference to the alignment marks formed on the under-cladding layer 1 simultaneously with the cores 2.

The materials to be used for the optical waveguide are generally transparent to visible light, so that image processing for a lithography process may be employed for the positioning of the photomask M3. The refractive index of the core material is higher than the under-cladding material and the over-cladding material at a wavelength to be employed, and a difference in refractive index between the core material and the under-cladding material or the over-cladding material is not less than 0.01. In the method (A), for example, the core pattern is recognized by utilizing the difference in refractive index, and binarized through image-processing. This permits highly accurate alignment. Of course, the positioning may be achieved by observation by means of an optical microscope or by operator's visual observation.

Where the substrate is transparent, the core pattern is illuminated with light from the rear side of the substrate for detection of the edges (contour) of the core pattern. Thus, the core pattern can be accurately recognized. Where the substrate is not transparent, the core pattern is illuminated with light from the upper side of the core pattern to be thereby profiled for recognition. The positioning of the photomask M3 is achieved with reference to the core pattern thus profiled. If the core pattern is employed as a reference for the positioning, the positioning is preferably based on an end portion of the core pattern (lens portions 2b) rather than based on an intermediate portion of the core pattern (straight portions 2a) for reduction of positional offset. Further, transversely outermost ones or a transversely outermost one of the cores 2 are preferably employed as a reference for the positioning. Of course, all the cores 2 may be employed as a reference.

In the method (B) in which the photomask M3 is positioned with reference to the positioning alignment marks preliminarily formed on the under-cladding layer 1 during the formation of the cores 2, the alignment marks are recognized by visual observation, by observation by means of an optical microscope, or by image processing or the like for the positioning of the photomask M3. Patterns of the alignment marks are provided separately from the core pattern in the photomask M2 designed for the exposure for the formation of the cores. Since the alignment marks and the cores 2 are simultaneously formed by the photolithography process, the relative dimensional and positional accuracy is typically about 0.1 μm. Therefore, even if the photomask M3 is positioned with reference to the alignment marks, the positioning accuracy can be maintained to be comparable to that obtained when the core pattern per se is employed as a reference. Where the alignment marks are used for the positioning of the photomask M3, the patterns of the alignment marks are preferably located in a peripheral portion of the photomask M2 rather than in a middle portion of the photomask M2. The alignment marks preferably each have a symmetrical shape such as a cross shape or a round shape, because the orientation of the alignment marks is unlikely to influence the image recognition.

After the positioning of the photomask M3 is completed, the over-cladding layer formation photosensitive resin layer 3' is exposed to the radiation L via the photomask M3. An exposed portion of the over-cladding layer formation photosensitive resin layer 3' serves as the over-cladding layer 3 after an unexposed portion dissolving step. Ultraviolet radiation is preferably used as the radiation. After the exposure, the resulting substrate is heat-treated for completion of a photo reaction. Thereafter, the over-cladding layer formation photosensitive resin layer 3' is developed with the use of a developing liquid, whereby an unexposed portion of the over-cladding layer formation photosensitive resin layer 3' is dissolved away. Then, the developing liquid is removed from the resulting over-cladding layer formation photosensitive resin layer 3' by heating. The remaining portion of the over-cladding layer formation photosensitive resin layer 3' serves as the over-cladding layer 3 having the extension portion 4 which includes the elevational walls 4a defining the optical fiber fixing grooves 5 therebetween and the boundary wall 6 as shown in FIG. 4F. In this method, the optical fiber fixing grooves 5 are formed as extending along the extension lines of the optical waveguide cores 2 coaxially with the cores 2. If the extension portion 4 extending to the one side has a length greater than a desired length, an excess longitudinal end portion of the extension portion 4 may be cut off by dicing with the use of a dicing blade or the like.

In the production method of the optical waveguide for the optical connection structure according to this embodiment, the over-cladding layer formation photosensitive resin is applied over the under-cladding layer 1 and the cores 2 to form the over-cladding layer formation photosensitive resin layer 3' including the extension portion formation photosensitive resin layer 4' extending longitudinally outward of the one-side ends of the cores 2, and the over-cladding layer formation photosensitive resin layer 3' is patterned by the photolithography process with reference to the positions of the cores or the positioning alignment marks to simultaneously form the over-cladding layer 3 and the optical fiber fixing grooves 5. Thus, the optical waveguide production method ensures that the optical fiber fixing grooves 5 can be efficiently and accurately formed with the use of the over-cladding layer material.

The optical waveguide production method does not employ the machining process which is employed for the production of the prior art optical connection structure and has a lower machining accuracy. Therefore, the optical fiber fixing grooves 5 can be formed as designed with higher dimensional and positional accuracy. Accordingly, the optical axes of the optical fibers 12 fitted in the respective grooves 5 are respectively aligned with the optical axes of the optical waveguide cores 2 with higher accuracy, whereby the optical coupling loss occurring between the optical fibers 12 and the optical waveguide cores 2 can be reduced. Thus, the production method ensures that the optical waveguide to be used for the optical connection structure can be efficiently produced as having a higher quality at lower costs.

In the inventive optical waveguide production method, the cores 2 are each formed as having the convex lens portion 2b at the one end thereof by the photolithography process, and the boundary wall 6 is formed between the lens portions 2b of the cores 2 and the other closed ends (right ends in FIG. 4F) of the optical fiber fixing grooves 5. With the optical fibers 12 fitted and fixed in the respective optical fiber fixing grooves 5, therefore, the optical fibers 12 do not directly contact the cores 2 in the inventive optical connection structure, so that the lens portions 2b of the cores 2 are free from distortion and damage.

Even if the optical axes of the optical fibers and the optical axes of the optical waveguide cores 2 are slightly misaligned, the optical coupling loss occurring due to the misalignment can be reduced. Even if the ends (optical connection surfaces) of the optical fibers 12 do not abut against the boundary wall 6 with a gap being present therebetween, the light gathering effect of the lens portions 2b ensures proper transmission of optical signals between the optical fibers 12 and the optical waveguide cores 2.

Exemplary materials to be used for the cladding-layers and the cores in the inventive optical waveguide production method include photosensitive resins (photopolymerizable resins) such as based on epoxy resins, polyimide resins, acryl resins, methacryl resins, oxetane resins and silicone resins, among which cationically polymerizable epoxy resins are preferred for costs, film thickness controllability, loss and the like.

The photopolymerizable resins are blended with a photocatalyst such as a photoacid generator, a photobase generator or a photoradical polymerization initiator to provide a photopolymerizable resin composition. Other additives to be blended as required include a reactive oligomer, a diluent, a coupling agent and the like.

Usable as the photoacid generator are an onium salt and a metallocene complex. Examples of the onium salt include diazonium salts, sulfonium salts, iodonium salts, phosphonium salts and selenonium salts.

Exemplary counter ions in these salts include anions such as $CF_3SO_3^-$, $BF_4^-$, $PF_6^-$, $AsF_6^-$ and $SbF_6^-$. Specific examples of the onium salt include triphenylsulfonium trifluoromethanesulfonate, 4-chlorobenzenediazonium hexafluorophosphate, triphenylsulfonium hexafluoroantimonate, triphenylsulfonium hexafluorophosphate, (4-phenylthiophenyl)diphenylsulfonium hexafluoroantimonate, (4-phenylthiophenyl)diphenylsulfonium hexafluorophosphate, bis[4-(diphenylsulfonio)phenyl]sulfide bishexafluoroantimonate, bis[4-(diphenylsulfonio)phenyl]sulfide bishexafluorophosphate, (4-methoxyphenyl)diphenylsulfonium hexafluoroantimonate, (4-methoxyphenyl)phenyliodonium hexafluoroantimonate, bis(4-t-butylphenyl)iodonium hexafluorophosphate, benzyltriphenylphosphonium hexafluoroantimonate and triphenylselenonium hexafluorophosphate. These compounds may be used either alone or in combination.

Examples of the reactive oligomer include epoxy oligomers of a fluorene derivative type and other types, and oligomers of epoxy(meth)acrylate, urethane acrylate, butadiene acrylate and an oxetane compound. Particularly, the oligomers of the oxetane compound are preferred because they are effective to promote the curing of the polymerizable mixture even with addition of a small amount thereof. Examples of the oxetane compound include 3-ethyl-3-hydroxymethyloxetane, 3-ethyl-3-(phenoxymethyl)oxetane, di(1-ethyl(3-oxetanyl)) methyl ether and 3-ethyl-3-(2-ethylhexylmethyl)oxetane. These reactive oligomers may be used either alone or in combination.

Examples of the diluent include alkyl monoglycidyl ethers, such as butyl glycidyl ether and 2-ethylhexyl glycidyl ether, having 2 to 25 carbon atoms, butanediol diglycidyl ether, 1,6-hexanediol diglycidyl ether, neopentyl glycol diglycidyl ether, dodecanediol diglycidyl ether, pentaerythritol polyglycidyl ethers, trimethylolpropane polyglycidyl ethers, glycerol polyglycidyl ethers, phenyl glycidyl ether, resorcinol glycidyl ether, p-tert-butylphenyl glycidyl ether, allyl glycidyl ether, tetrafluoropropyl glycidyl ether, octafluoropropyl glycidyl ether, dodecafluoropentyl glycidyl ether, styrene oxide, 1,7-octadiene diepoxide, limonene diepoxide, limonene monoxide, α-pinene epoxide, β-pinene epoxide, cyclohexene epoxide, cyclooctene epoxide and vinylcyclohexene oxide.

Examples of the diluent preferred for heat resistance and transparency include epoxy diluents, such as 3,4-epoxycyclohexenylmethyl 3',4'-epoxycyclohexenecarboxylate, 3,4-epoxycyclohexenylethyl 3,4-epoxycyclohexenecarboxylate, vinylcyclohexene dioxide, allylcyclohexene dioxide, 3,4-epoxy-4-methylcyclohexyl-2-propylene oxide and bis(3,4-epoxycyclohexyl)ether, having an alicyclic structure in the molecule thereof. By adding a proper amount of any of these diluents to an epoxy base resin, the reactivity of epoxy groups can be increased, whereby the resulting cured epoxy film has improved heat resistance and flexibility.

Usable as the coupling agent is an epoxy coupling agent. Examples of the epoxy coupling agent include 2-(3,4-epoxycyclohexyl)ethyltrimethoxysilane, 3-glycidoxypropyltrimethoxysilane, 3-glycidoxypropylmethyldiethoxysilane and 3-glycidoxypropyltriethoxysilane. An amino coupling agent such as 3-aminopropyltrimethoxysilne or 3-aminopropyltriethyoxysilane is also usable.

In consideration of expansion and contraction of the resin after the curing, it is preferred that the photopolymerizable resin composition for the formation of the over-cladding layer does not contain a solvent for adjustment of the viscosity (an organic solvent which is not reactive with the photosensitive base resin but serves for swelling and plasticizing the resin). Where the epoxy resin is used as the base resin, for example, a liquid epoxy monomer is used instead of the solvent to prepare the over-cladding layer material without the use of the solvent. Examples of the liquid epoxy monomer include CELLOXIDE 2021P commercially available from Daicel Chemical Industries, Ltd., CELLOXIDE 2081 commercially available from Daicel Chemical Industries, Ltd., and ADEKA RESIN EP-4080E manufactured by ADEKA Corporation. Without the use of the solvent, a solid or viscous liquid epoxy resin is dissolved in the liquid epoxy monomer.

An inventive example will hereinafter be described. However, it should be understood that the present invention be not limited to the inventive example.

EXAMPLES

Prior to the description of the inventive example, materials employed in the inventive example will be described below.
Cladding Material for Under-Cladding Layer and Over-Cladding Layer A cladding material was prepared by dissolving the following ingredients in 40 parts by weight of ethyl lactate (available from Wako Pure Chemical Industries, Ltd.) at a temperature of 80° C. with stirring at 250 rpm for 3 hours:

(A) 70 parts by weight of bisphenoxyethanolfluorene diglycidyl ether (OGSOL EG available from Osaka Gas Chemicals Co., Ltd.);
(B) 30 parts by weight of 1,1,3-tris{2,5-dimethyl-4-[2-(3-oxetanyl)]butoxyphenyl}-3-phenylpropane (available from Nitto Denko Corporation, see JP-A-2007-191433); and
(C) 1 part by weight of a 50% propione carbonate solution of 4,4'-bis[di(β-hydroxyethoxy)phenylsulfinio]phenylsulfide bishexafluoroantimonate (photoacid generator).

The cladding material thus prepared in a varnish form had a viscosity of 1300 mPa·s as measured by a digital viscometer (Brookfield's HBDV-I+CP).

Core Material

A core material (photopolymerizable resin composition) was prepared by dissolving the following ingredients in 55 parts by weight of cyclohexanone (available from Wako Pure Chemical Industries, Ltd.) at a temperature of 80° C. with stirring at 400 rpm for 18 hours:
(A) 70 parts by weight of bisphenoxyethanolfluorene diglycidyl ether (OGSOL EG available from Osaka Gas Chemicals Co., Ltd.);
(D) 30 parts by weight of bisphenolfluorene diglycidyl ether (OGSOL PG available from Osaka Gas Chemicals Co., Ltd.); and
(C) 1 part by weight of a 50% propione carbonate solution of 4,4'-bis[di(β-hydroxyethoxy)phenylsulfinio]phenylsulfide bishexafluoroantimonate (photoacid generator)

The core material thus prepared in a varnish form had a viscosity of 1000 mPa·s as measured by the digital viscometer (Brookfield's HBDV-I+CP).

Formation of Under-Cladding Layer

The cladding material for the under-cladding layer was applied on a surface of a 500-μm thick silicon wafer substrate (available from Silicon Technology Co., Ltd.) by a spin coater (1X-DX2 available from Mikasa Co., Ltd.) Then, the resulting under-cladding material layer was exposed to 365-nm radiation at 4000 mJ/cm$^2$ via a quartz photomask M1 having a rectangular opening pattern for the under-cladding layer and opening patterns for two ring-shaped alignment marks A (having a diameter of 1 mm and a width of 50 μm) spaced from each other along a line extending longitudinally (parallel to a longitudinal edge) of the rectangular opening by means of an exposing machine (MA-60F available from Mikasa Co., Ltd.) and an ultrahigh pressure mercury lamp (USH-250D available from Ushio Inc.) In turn, the resulting substrate was heat-treated at 70° C. for 15 minutes. Then, the resulting substrate was dipped in γ-butyrolactone (available from Mitsubishi Chemical Corporation) for 3 minutes, whereby an unexposed portion of the cladding material layer was dissolved away for development. Thereafter, the resulting substrate was heat-treated at 150° C. for 15 minutes. Thus, the under-cladding layer and the two ring-shaped alignment marks A were formed on the substrate. The under-cladding layer thus formed had a thickness of 38 μm as measured by observing a section of the under-cladding layer by means of a digital microscope (KEYENCE's VHX-200).

Formation of Cores

The core material was applied on a surface of the under-cladding layer by the spin coater (1X-DX2 available from Mikasa Co., Ltd.) and then dried at 150° C. for 20 minutes to form a core material layer. A quartz photomask M2 was prepared, which had 12 opening patterns longitudinally extending parallel to each other as corresponding to straight portions of cores (the width of each of the cores/pitch between the cores=40 μm/210 μm) (see a mask pattern M2 in FIG. 4C), opening patterns for lens portions each having a wider curved surface (see a mask pattern M2 in FIG. 4C), and patterns for two cross-shaped alignment marks B (each having a length of 1 mm and a width of 50 μm) spaced from each other along a line longitudinally extending parallel to the opening patterns.

The quartz photomask M2 was placed above the core material layer on the under-cladding layer, and positioned so that the patterns for the cross-shaped alignment marks B were respectively accommodated in the ring-shaped alignment marks A as seen in plan. Then, the core material layer was exposed to 365-nm radiation at 37000 mJ/cm$^2$ via the quartz photomask M2 by means of the exposing machine (MA-60F available from Mikasa Co., Ltd.) and the ultrahigh pressure mercury lamp (USH-250D available from Ushio Inc.) In turn, the resulting substrate was heat-treated at 100° C. for 60 minutes. Then, the resulting substrate was dipped in γ-butyrolactone (available from Mitsubishi Chemical Corporation) for 3 minutes, whereby an unexposed portion of the core material layer was dissolved away for development. Thereafter, the resulting substrate was heat-treated at 150° C. for 30 minutes. Thus, 12 cores and two cross-shaped alignment marks B (respectively accommodated in the ring-shaped alignment marks A as seen in plan) were formed on the resulting substrate. The straight portions of the cores thus formed each had a sectional size of 50 μm×50 μm (width× height) as measured by means of the digital microscope (KEYENCE's VHX-200).

Formation of Over-Cladding Layer

The cladding material for the over-cladding layer was applied over the under-cladding layer and the cores on the resulting substrate by a spin coating method to form an over-cladding material layer which covered an over-cladding layer formation region including an extension portion formation region extending longitudinally outward of one-side ends of the cores.

Then, a quartz photomask M3 was prepared, which had an opening pattern for the over-cladding layer including the extension portion (see mask pattern M3 in FIG. 4E) and a comb-like mask pattern provided at a longitudinal end of the opening pattern for elevational walls and optical fiber fixing grooves (see mask pattern M3 in FIG. 4E). The opening pattern of the photomask M3 had an opening pattern portion for a boundary wall to be provided between closed ends of the optical fiber fixing grooves and the cores. The photomask M3 further included two cross-shaped alignment marks C (each having an edge length of 1 mm and a width of 100 μm) spaced from each other along a line extending longitudinally parallel to a longitudinal edge of the opening pattern for the over-cladding layer.

Then, the quartz photomask M3 was placed above the resulting substrate. After the positions of the cross-shaped alignment marks B were detected by means of an optical microscope for observing the alignment marks, the photomask M3 was accurately horizontally positioned by aligning the cross-shaped alignment marks C of the photomask M3 with the alignment marks B.

Thereafter, the over-cladding material layer was exposed to 365-nm radiation at 4000 mJ/cm$^2$ via the photomask M3 by means of the exposing machine (MA-60F available from Mikasa Co., Ltd.) and the ultrahigh pressure mercury lamp (USH-250D available from Ushio Inc.) In turn, the resulting substrate was heat-treated at 70° C. for 15 minutes. Then, the resulting substrate was dipped in γ-butyrolactone (available from Mitsubishi Chemical Corporation) for 3 minutes, whereby an unexposed portion of the over-cladding material layer was dissolved away for development. Thereafter, the resulting substrate was heat-treated at 150° C. for 15 minutes. Thus, the over-cladding layer was formed, whereby the optical waveguide was produced as having the extension portion.

The optical waveguide including the over-cladding layer had a thickness of 130 μm as measured by observing a section of the optical waveguide by means of the digital microscope (KEYENCE's VHX-200).

Edge Trimming of Optical Waveguide

A part of the over-cladding layer projecting outward of the under-cladding layer was trimmed by dicing, whereby one-side ends (optical fiber insertion holes) of the optical fiber fixing grooves were exposed in an end face of the optical waveguide thus produced. Thus, the optical waveguide for the optical connection structure according to this example was produced.

Fixing of Optical Fibers

Finally, optical fibers were fitted in the respective optical fiber fixing grooves of the optical waveguide thus produced, and fixed in the grooves by applying a proper amount of a UV-curable epoxy adhesive (E3129 commercially available from NTT Advanced Technology Corporation) dropwise in the optical fiber fixing grooves and irradiating the UV-curable epoxy adhesive with predetermined ultraviolet radiation. Thus, a unitary structure (optical connection structure) including the optical fibers and the optical waveguide was produced.

Since the optical fiber fixing grooves provided in the extension portion were coaxial with the corresponding optical waveguide cores in the optical waveguide thus produced, the optical fibers fitted and fixed in the respective optical fiber fixing grooves were automatically properly positioned with respect to the corresponding optical waveguide cores. Thus, the optical connection structure employing this optical waveguide ensured that the optical axes of the optical fibers were aligned with the optical axes of the optical waveguide cores without centering.

As described above, the optical connection structure permits easy and automatic alignment between the optical axes of the optical fibers and the optical axes of the optical waveguide cores and, therefore, is suitable for optical interconnection which connects boards in an electronic device or connects chips on a board. Further, the production method of the optical waveguide for the optical connection structure permits the efficient production of the optical waveguide to be used for the optical connection structure at lower costs.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. An optical connection structure comprising:
   an optical waveguide including a light transmission core, an under-cladding layer underlying the core, and an over-cladding layer provided over the core; and
   an optical fiber fixed to a longitudinal end of the optical waveguide for mutual transmission of an optical signal between the optical fiber and the core of the optical waveguide;
   wherein the over-cladding layer of the optical waveguide includes an extension portion provided in a longitudinal end portion thereof;
   wherein the extension portion includes an optical fiber fixing groove extending along an extension line of the core coaxially with the core and having opposite ends, one end being open in an end face of the extension portion and the other end being closed; and a boundary wall provided between the core and the other end of the optical fiber fixing groove; and
   wherein the optical fiber is fitted and fixed in the optical fiber fixing groove with an optical axis of the optical fiber being aligned with an optical axis of the core of the optical waveguide via the boundary wall.

2. The optical connection structure of claim 1, wherein the over-cladding layer is a layer formed from a photosensitive resin with reference to a position of the core or a positioning alignment mark.

3. The optical connection structure of claim 1, wherein the core includes a lens portion provided at a longitudinal end thereof, the lens portion an outwardly convex lens surface.

4. An optical waveguide production method for producing an optical waveguide to be used for an optical connection structure, the optical waveguide including a core, an under-cladding layer, and an over-cladding layer including an extension portion provided in a longitudinal end portion thereof, the extension portion including an optical fiber fixing groove which extends along an extension line of the core coaxially with the core and having opposite ends, one end being open in an end face of the extension portion and the other end being is closed, the extension portion further including a boundary wall provided between the core and the other end of the optical fiber fixing groove, the optical waveguide production method comprising:
   forming the under-cladding layer;
   forming the core on the under-cladding layer;
   applying an over-cladding layer formation photosensitive resin over the under-cladding layer and the core to form an over-cladding layer formation photosensitive resin layer including an extension portion formation photosensitive resin layer extending longitudinally outward of an end of the core;
   exposing the over-cladding layer formation photosensitive resin layer via a photomask by irradiation with radiation; and
   developing the over-cladding layer formation photosensitive resin layer;
   whereby the over-cladding layer including the extension portion is formed and, at the same time, the optical fiber fixing groove is formed in the extension portion with the boundary wall being present between the end of the optical fiber fixing groove and the core.

5. The optical waveguide production method of claim 4, wherein the photomask for the over-cladding layer is positioned with reference to a position of the core or a positioning alignment mark to form the optical fiber fixing groove coaxially with the core.

* * * * *